Dec. 18, 1951     E. L. ERICKSON     2,579,228
APPARATUS FOR SEPARATING PARTICLES
OF DIFFERENT DENSITIES
Filed Jan. 23, 1947                     2 SHEETS—SHEET 1
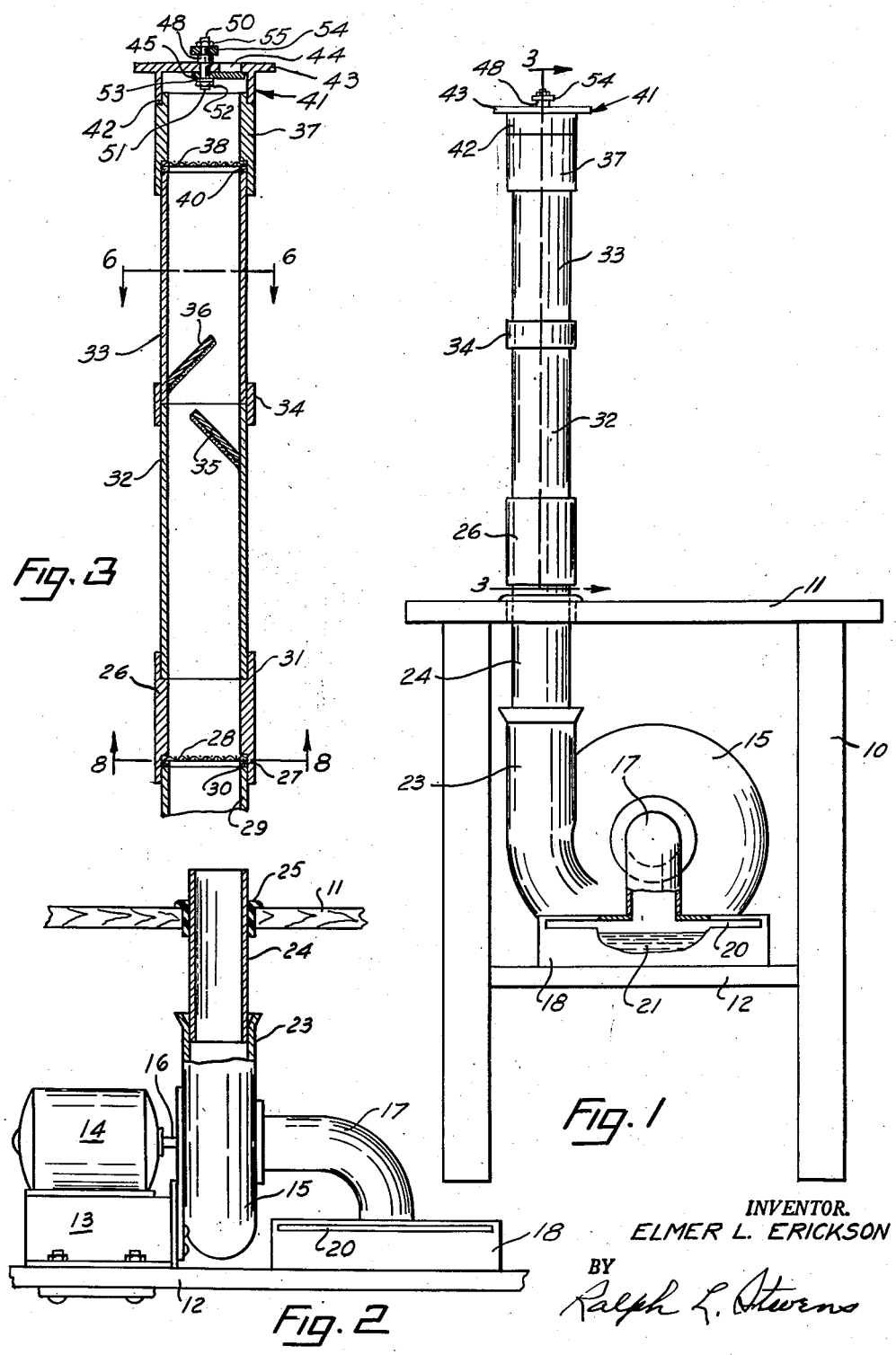
INVENTOR.
ELMER L. ERICKSON
BY
Ralph L. Stevens INVENTOR.
ELMER L. ERICKSON
BY
Ralph L. Stevens Patented Dec. 18, 1951

2,579,228

UNITED STATES PATENT OFFICE 2,579,228

APPARATUS FOR SEPARATING PARTICLES OF DIFFERENT DENSITIES

Elmer L. Erickson, Brookings, S. Dak.

Application January 23, 1947, Serial No. 723,723

6 Claims. (Cl. 209—139)

This invention relates to methods and apparatus for separation of particles of different densities, by subjecting them to a controlled current of air or other gaseous medium and causing them to be classified and collected at various points along the line of air flow.

Although not limited thereto, the present invention is concerned primarily with the separation and classification of the ingredients of samples taken from a particular seed crop, or from commercial seeds sold in bulk. Devices used for this purpose are commonly known as "seed blowers" and usually comprise a tube containing a seed cup and a trap, and means for blowing an air current through the cup and past the trap. The object is to so regulate the current and so correlate the parts that the heavier fertile seeds remain in the cup and that the lighter portions such as foreign matter and empty florets are collected in the trap.

The blowing usually is done through a vertical column, with the material at the bottom and the current passing upwardly through a valve and thence through the material so that parts of the latter are carried along in suspension. An air valve at the bottom is difficult to control to afford a uniform blast, particularly when starting, and the current cannot be held accurately to a desired velocity despite the fact that the blower motor runs at constant speed. This may result in deposition of heavy particles in the trap and in clogging of the upper screen with lighter particles.

Accordingly, it is the primary object of the present invention to devise a classifier of this type in which the control valve is located at the discharge end, for convenient access and for more accurate regulation of the current. In this connection it is an object to improve the valve itself, principally by so shaping the valve port and so correlating it with a visible scale that equal variations in area of the port correspond to equal scale increments.

Earlier devices also are objectionable because of the use of a single trap, which can permit some of the lighter suspended material to escape backwardly through the trap when the air blast is cut off. Moreover, since some columns are formed of glass this objection is accentuated by electrostatic action which causes light particles to cling to the glass walls above the trap opening so that they can drop past the trap if they break away. The action of static electricity is in itself undesirable because it may cause substantial material to cling for some time above the trap, instead of permitting it to fall thereinto for measurement or for weighing. In the event the column is made of opaque material such as metal the action within the column cannot be observed, and any particles adhering to the inside wall are undetected. In my device, later described, such observations can be readily made.

Therefore, further major objects of the present invention are to provide a multi-part trap through which particles can pass in only one direction; and to minimize or eliminate static electricity. I have discovered that the latter object is best attained by humidifying the air before it passes through the column. It also is helpful to construct the blower column from a plurality of separable sections, and to wave the surfaces of the interfitted parts for protective purposes. Waxing the joints also seals them and facilitates separation of the sections.

Another object resides in the replacement of glass by a transparent plastic, such as methyl methacrylate, which is easier to fashion and is much less frangible.

In the accompanying drawings:

Fig. 1 is an end elevational view of a preferred embodiment of my invention and its mounting structure.

Fig. 2 is a side elevational view of a portion of the apparatus seen in Fig. 1, with some parts in section.

Fig. 3 represents a vertical section taken, as on the plane of line 3—3 in Fig. 1, centrally of the blower column.

Figure 4:
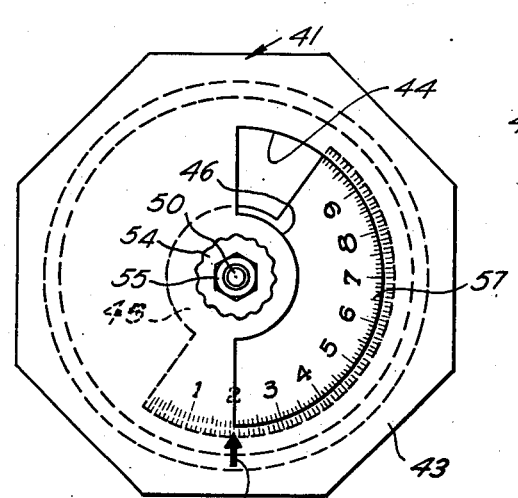
Fig. 4 shows, on increased scale, a top plan view of the valved cap of the column.
Figure 5:
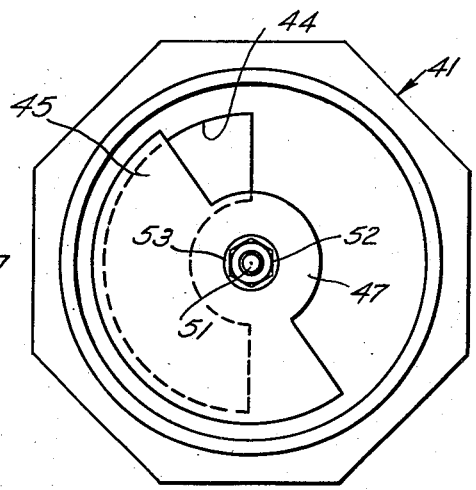
Fig. 5 represents a bottom plan view of the cap of Fig. 4.
Figure 6:
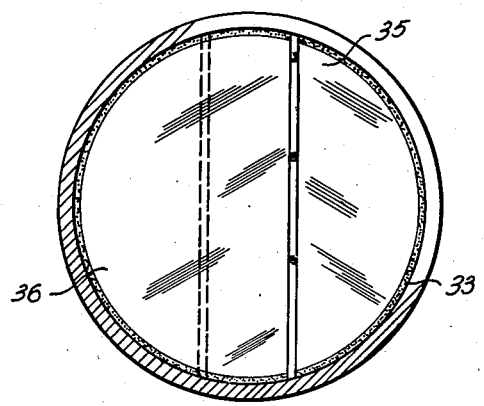
Fig. 6 is a cross section taken on the plane of line 6—6, Fig. 3.
Figure 7:
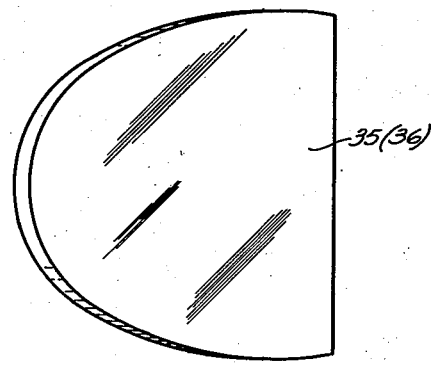
Fig. 7 is a detail view of one of the trap elements, looking perpendicularly to the face thereof.
Figure 8:
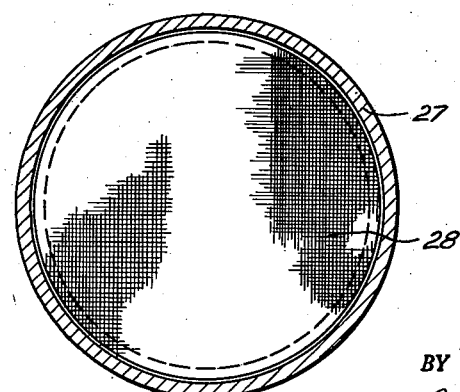
Fig. 8 is a cross section taken on the plane of line 8—8, Fig. 3.

With continued reference to the drawings, and with particular reference first to Figs. 1 and 2, the complete assembly includes a work bench—preferably in the form of a table as shown—comprising a set of legs 10, having a top 11 mounted thereupon and also supporting a shelf 12. The shelf has a flanged mounting unit 13 secured thereto which serves to support an electric motor 14 and also a fan or blower housing 15. The blades (not shown) within the housing 15 are driven by a shaft 16 in conventional manner to draw air through an intake pipe 17 that is connected to the top of a receptacle 18. The latter contains water 21 to a level below a plurality of apertures 20 through which air enters from the atmosphere to have its humidity increased when necessary.

The blower housing 15 has a discharge conduit 23 directed upwardly to receive the lower end of a pipe 24 that extends through and beyond an aperture in the shelf 11. A ring 25 of rubber or the like preferably surrounds the pipe to absorb vibration. The apparatus thus far described affords a very satisfactory means for producing a humidified stream of air, and also affords a mounting at convenient working level for a classifying unit now to be described.

The classifying unit, as seen above the table top, preferably consists of a column of multiple, separable parts, although as few as two parts may be utilized. Also it should be understood that this unit may be made of any suitable material, though a chemo-plastic such as "Lucite" is preferred because of its transparency in uncolored state and its permanence when compared to other transparent materials. The first section above the table, in the form of a perforated receptacle which may be called "the cup," comprises a sleeve 26 recessed at its lower end to form a cyclindrical extension 27 for detachable connection through a telescoped pipe section 29 to the pipe 24. A screen 28 is suitably held in horizontal position within the extension 27 as, for example, by a ring 30 cemented in place or simply held in place by the section 29. The upper end of the sleeve 26 has an extension 31 for reception of the remainder of the classifying unit.

Into the extension 31 there is slidably and rather closely fitted an elongated tube, preferably formed in two sections 32, 33 of the same diameter, united and sealed by a reenforcing ring 34 which may be cemented thereto to make the parts 32, 33 and 34 a rather permanent unit. The sections 32 and 33 carry, respectively, inclined plates 35 and 36 shaped and arranged to afford a trap through which any material blown upwardly can pass but cannot drop back beyond the plate 35. This is because the plates are arranged diametrically opposite each other, with slight overlap, and because each will catch what the other misses. My improved arrangement affords maximum accuracy, and also greatly shortens the period for testing seeds or for assorting solids of similar nature.

The plates 35 and 36 may be cemented or otherwise secured in place—the band 34 being provided for convenience of assembly—but it should be understood that the sections 32 and 33 may be made in one piece and the plates subsequently attached thereto.

Above the section 33 there is removably fitted a sleeve 37—similar to sleeve 26—embodying a lower extension telescoped upon the section 33 and an upper extension designed to receive a valved cap about to be described. A screen 38 of, for example, 100 mesh, is held in place by a ring 40 to prevent any inwardly blown material from escaping into the atmosphere. The sleeve 37 and its associated parts are detachable so that the trapped contents from the plates 35, 36 can be poured out and weighed when the sections 32, 33 are separated from the sleeve 26 and thereafter tilted.

The sleeve 37, as shown, is annularly recessed to form a shouldered receptacle for the lower cylindrical part of a sleeve 42 forming an integral portion of a valved cap member, designated in entirety by the numeral 41. This valved member is an important factor in readily selecting and controlling the pressure and velocity of the upwardly flowing air stream. Its location makes adjustment and removal very convenient, and also provides a constantly visible scale. The valve itself, as now to be described, is so designed as to afford smooth regulation of the air current and to preclude any chance for error in adjustment.

The sleeve 42 is topped by an integral plate 43 that has an approximately semicircular port 44 formed therein with its center aligned with the column axis. A semicircular flat valve 45, slightly greater in radius than the port, is disposed below the latter for oscillation to vary the port size. The plate and valve are interconnected by overlapt, semicircular, hub elements 46 and 47, respectively, formed integral therewith and pierced by a special bolt 48 that is rotatable within the hub 46. The upper end of the bolt has a threaded end 50 surrounded by a knurled manipulating knob 54 which is held nonrotatably thereon by a nut 55. (The knob of course could be formed integral with the bolt.) The lower end 51 of the bolt is surrounded by a spring washer 53, and threaded to receive a nut 52 which compressed the washer to cause the hub 47 to rotate with the bolt. (The end 51 of course might be squared or otherwise positively locked to the hub 47.) These details of the interconnection are important only to the provision of a complete disclosure.

The plate 56 is marked with an arrow 56 to serve as a "zero" point against which scale indicia 57 on the valve 45 may be compared. As shown in Fig. 4, the valve has been opened to the extent of 20 full scale increments out of a possible 100, which for example would be sufficient for handling and testing the smaller grass seeds and the like. Due to the shape of the port 44, the main scale indicia and their subdivisions can be spaced equally to afford readings corresponding to arithmetically equal changes in the air flow, thus permitting speedy adjustment with little or no chance for error. The arcuate length of the port 44 of course may be increased or reduced, depending upon the range of sizes and densities of the particles to be classified. Likewise, the uniform width of the port may be varied.

When assembling the parts of the classifying unit, all contracting surfaces of the joints preferably are first rubbed with steel wool and then waxed with paraffin, the primary purpose of this treatment being to facilitate separation and reassembly of the several detachable sections. The wax also seals the joints.

Operation of the apparatus should now be fairly obvious. With the motor idle and with the cup and trap empty, the section 32 and all parts above it are removed as a unit and then a preweighed quantity of material is placed within the cup upon the screen 28. Assuming that seeds are to be tested, the material may comprise, for example, grass seeds, or crop seeds such as oats or millet. The parts are then reassembled, the valve is opened slightly and the motor is switched on to cause a current of humidified air to flow upwardly in a steady stream through the column.

When the valve is opened to sufficient extent (or set accurately initially in the light of previous tests of the same kind of material), the air blast will carry empty or infertile florets upwardly for collection in the overlapt trap elements 35, 36. Some inert or foreign material may also be trapped, and if necessary a second blowing at higher velocity may be utilized to insure that all of such material and the light infertile seeds are separated from the original mass. The blowing time may vary from a few seconds to several minutes. After stopping the motor and permitting complete settling, the classified masses are separately removed for individual weighing and any other treatments that may be conventional or desirable in the testing of seeds.

It should be understood that changes in the structure and variations in the method may be made within the scope and spirit of the invention.

What is claimed is:

1. In an apparatus for classifying seed particles, an upright column having a perforated detachable receptacle at its bottom for the particles and a screwing cap at its top, means for passing a gaseous stream through said receptacle and said column, the openings of said receptacle and said cap being of such sizes that the agitated particles cannot escape from the space between the receptacle and the cap, and a trap disposed above said receptacle and designed to permit upward passage of the stream and any suspended particles therethrough, said trap comprising a pair of plates vertically spaced apart and attached to opposite sides of the column to afford pockets to catch descending particles, said plates being inclined towards each other and slightly overlapt so that one overhangs the other.

2. In a device for assorting and classifying seed particles of varying densities by suspension within and gravitation from a flowing gaseous medium, an upright chamber comprising a pair of permanently joined but initially separate sections, a trap comprising a plate in each section and attached thereto to form an upwardly opened pocket, said plates being opposed and partially overlapt, a measuring cup detachably receiving the lower end of said chamber, means for blowing particles upwardly into said chamber, and a valved screening top detachably mounted upon the upper end of said chamber to regulate the flow and to prevent escape of any particles from said chamber.

3. A classifying and assorting column comprising a sleeve designed for connection to a source of fluid current, a cup detachably connected to said sleeve and embodying a substantially horizontal perforated member, and an upright column detachably mounted upon said cup, said column comprising a tubular trap section and a cap detachably fitted to the upper end of said section, said cap embodying a valve comprising a pair of superposed flat plates arranged in surface contact, one of the plates having an arcuate port of uniform width, and the other being manually oscillatable about an axis at the center of the circular curvature of said port, and said cap further embodying a screen disposed at a substantial distance below said plates.

4. In a method of classifying seeds, placing a quantity of the seed within the lower end of an open but screened column, forcing a gaseous medium upwardly into the lower end of the column, controlling the flow at the upper end of the column so that the velocity is sufficient to elevate light particles but insufficient to elevate fertile seeds, trapping the elevated lighter particles in a zone well above said lower end, and removing said particles and said fertile seeds separately for measurement and comparison.

5. In a method of sorting and classifying particles of material such as grass and grain seeds and the like by blowing some of the material into suspension within a classifying structure that may have a tendency to become charged with static electricity, the steps of humidifying abnormally dry atmospheric air by simply flowing it in a relatively thin layer over a small quiescent pool of water for surface contact therewith, and causing the humidified air to blow through said material and into said structure.

6. In a seed blower of the character described, a device forming a classifying chamber through which a gaseous medium may be passed and embodying material that may tend to become charged with static electricity; apparatus for supplying the medium to said chamber; and means, forming a part of said apparatus, for humidifying the gaseous medium as it flows to said chamber; said means comprising a receptacle containing a vaporizable liquid, the upper part of said receptacle designed to cause the gaseous medium to take the form of a relatively thin layer in flowing contact with the liquid during its passage through the receptacle towards said chamber.

ELMER L. ERICKSON.

REFERENCES CITED

The following references are of record in the file of this patent:

UNITED STATES PATENTS

| Number | Name | Date |
|---|---|---|
| Re. 1,354 | Booth | Nov. 18, 1862 |
| 198,775 | Milbank | Jan. 1, 1878 |
| 244,114 | De Soulages | July 12, 1881 |
| 550,710 | Eads | Dec. 3, 1895 |
| 609,540 | Gray | Aug. 23, 1898 |
| 740,233 | Clark | Sept. 29, 1903 |
| 1,186,525 | Pearson | June 6, 1916 |
| 1,212,596 | Williams | Jan. 16, 1917 |
| 1,250,553 | Bryan | Dec. 18, 1917 |
| 1,312,291 | Wicker | Aug. 5, 1919 |
| 2,034,185 | Hautain | Mar. 17, 1936 |
| 2,062,064 | Knox, Jr., et al. | Nov. 24, 1936 |
| 2,259,517 | Drenkard | Oct. 21, 1941 |
| 2,273,296 | Stump | Feb. 17, 1942 |
| 2,416,202 | Naumann | Feb. 18, 1947 |

FOREIGN PATENTS

| Number | Country | Date |
|---|---|---|
| 20,917 | Great Britain | July 5, 1906 |